United States Patent
Paukner et al.

(10) Patent No.: US 10,941,689 B2
(45) Date of Patent: Mar. 9, 2021

(54) METHOD AND DEVICE FOR THE EXHAUST GAS AFTERTREATMENT OF A COMBUSTION ENGINE

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE); Michael Manz, Langenhagen (DE); Michael Kaack, Rötgesbüttel (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 16/534,091

(22) Filed: Aug. 7, 2019

(65) Prior Publication Data
US 2020/0049050 A1 Feb. 13, 2020

(30) Foreign Application Priority Data
Aug. 7, 2018 (DE) .......... 10 2018 119 156

(51) Int. Cl.
*F01N 3/10* (2006.01)
*F01N 3/20* (2006.01)
(Continued)

(52) U.S. Cl.
CPC .......... *F01N 3/2026* (2013.01); *F01N 3/101* (2013.01); *F01N 3/2033* (2013.01);
(Continued)

(58) Field of Classification Search
CPC .... F01N 11/002; F01N 11/007; F01N 13/009; F01N 13/0093; F01N 9/00;
(Continued)

(56) References Cited

U.S. PATENT DOCUMENTS

2006/0053772 A1* 3/2006 Dou ............... F01N 11/007
60/285
2007/0157606 A1 7/2007 Schenck Zu Schweinsberg
(Continued)

FOREIGN PATENT DOCUMENTS

CN 101306685 A 11/2008
CN 102191981 A 9/2011
(Continued)

OTHER PUBLICATIONS

Extended Search report for European Patent Application No. 19190290.7, dated Oct. 17, 2019.
(Continued)

*Primary Examiner* — Audrey K Bradley
*Assistant Examiner* — Dapinder Singh
(74) *Attorney, Agent, or Firm* — Pearl Cohen Zedek Latzer Baratz LLP

(57) ABSTRACT

A method for the exhaust gas aftertreatment of a combustion engine having an exhaust system in which at least three catalytic converters and at least three lambda probes are disposed. Downstream of a first catalytic converter, an actively heatable catalytic converter is provided, which is actively heated at a start of the combustion engine. The lambda control of the combustion engine is carried out in each case by that lambda probe disposed downstream of the respective last catalytic converter to reach the light-off temperature thereof. Also, an exhaust gas aftertreatment system for implementing such a method.

15 Claims, 2 Drawing Sheets

(51) Int. Cl.
*F01N 13/00* (2010.01)
*F01N 11/00* (2006.01)
*F02D 41/02* (2006.01)
*F02D 41/14* (2006.01)

(52) U.S. Cl.
CPC .......... *F01N 11/002* (2013.01); *F01N 11/007* (2013.01); *F01N 13/0093* (2014.06); *F02D 41/025* (2013.01); *F02D 41/0255* (2013.01); *F02D 41/1454* (2013.01); *F01N 2900/0416* (2013.01); *F01N 2900/08* (2013.01); *F01N 2900/1402* (2013.01); *F01N 2900/1404* (2013.01); *F01N 2900/1602* (2013.01)

(58) Field of Classification Search
CPC .......... F01N 2240/16; F01N 2560/025; F01N 2560/14; F01N 3/021; F01N 3/027; F01N 3/0281; F01N 3/101; F01N 3/2013; F01N 3/2026; F01N 3/2033; F01N 3/38; F01N 2900/0416; F01N 2900/08; F01N 2900/1402; F01N 2900/1404; F01N 2900/1602; F02D 41/025; F02D 41/0255; F02D 41/1454
USPC .......... 60/274, 277, 286, 295, 299–301, 297, 60/311
See application file for complete search history.

(56) References Cited

U.S. PATENT DOCUMENTS

| | | | |
|---|---|---|---|
| 2008/0282673 A1* | 11/2008 | Gonze | B60W 10/30 60/284 |
| 2011/0219752 A1 | 9/2011 | Gonze et al. | |
| 2011/0220084 A1 | 9/2011 | Burak et al. | |
| 2013/0028818 A1* | 1/2013 | Eckhoff | F01N 13/009 423/212 |
| 2016/0160723 A1* | 6/2016 | Thomas | F01N 3/0232 60/274 |
| 2016/0363031 A1 | 12/2016 | Mayer | |

FOREIGN PATENT DOCUMENTS

| | | |
|---|---|---|
| DE | 10 2005 054 733 A1 | 5/2007 |
| DE | 60 2004 009 729 T2 | 8/2008 |
| DE | 10 2010 002 586 A1 | 9/2011 |
| DE | 10 2012 011 113 A1 | 12/2013 |
| DE | 10 2013 201 734 A1 | 8/2014 |
| DE | 10 2017 100 892 A1 | 7/2018 |
| DE | 10 2017 118 215 A1 | 2/2019 |
| EP | 2 884 066 A1 | 6/2015 |
| WO | WO 2018/134151 A1 | 7/2018 |

OTHER PUBLICATIONS

Search report for German Patent Application No. 10 2018 119 156.1, dated Aug. 1, 2019.
Office Action and Search Report for Chinese Patent Application No. 1020190725139.5, dated Oct. 23, 2020.

* cited by examiner

METHOD AND DEVICE FOR THE EXHAUST GAS AFTERTREATMENT OF A COMBUSTION ENGINE

CROSS-REFERENCE TO RELATED APPLICATIONS

This application claims priority from German Patent Application No. 10 2018 119 156.1, filed Aug. 7, 2018, which is hereby incorporated by reference.

FIELD OF THE INVENTION

The present invention relates to a method for the exhaust gas aftertreatment of a combustion engine, and to an exhaust gas aftertreatment system for implementing such a method in accordance with the definition of the species set forth in the independent claims.

BACKGROUND OF THE INVENTION

Future emissions legislation will place stringent demands on untreated engine emissions and on the exhaust gas aftertreatment of combustion engines. With the introduction of the Euro 6d-Temp emissions legislation, it will be necessary for motor vehicles to adhere to emission limits in a realistic operation (real driving emissions). The use of multi-stage exhaust gas aftertreatment concepts in the gasoline engine field raises questions for new emissions legislation with regard to the controllability of the various exhaust gas aftertreatment components, as well as the control quality and service readiness thereof. A research concept that includes an exhaust system, which is already provided for a multi-stage exhaust gas aftertreatment, shows that a lambda control design is needed here, which takes into consideration the special features of the particular exhaust gas aftertreatment components and allows for them in the dynamic performance thereof. The challenge is also that every exhaust gas aftertreatment component must fulfill its own boundary conditions in order to optimally convert the pollutant components in the exhaust gas to make possible a maximally efficient exhaust gas aftertreatment. It turns out that only suboptimal emission results are obtained when a lambda control concept known from the related art having a control system of a fixed design is used.

German Patent Application DE 10 2010 002 586 A1 discusses a method for operating a combustion engine for a motor vehicle having an exhaust system in which at least one catalytic converter and at least one lambda probe are located. Following a cold start, the combustion engine is alternately operated with a lean and rich fuel-air mixture in order to heat the catalytic converter. Following the cold start, the lambda probe is heated in a way that makes it operational after a maximum of ten seconds, and a two-step control based on a signal from the lambda probe is used to operate the combustion engine. In response to the signal from the lambda probe, a change is initiated in each particular case between the operation with the lean fuel-air mixture and with the rich fuel-air mixture.

German Patent Application 10 2013 201 734 A1 describes a method for operating a lambda probe system in the exhaust system of a combustion engine having at least one first lambda probe upstream of a catalytic converter and at least one second lambda probe downstream thereof. In this context, the second lambda probe is designed as a step-change sensor. It provides for a characteristic offset of the first lambda probe to be diagnosed and, if indicated, for a characteristic offset error to be adapted. In an active lambda control, a value representing the capacity of the catalytic converter to store oxygen, and a further value representing the capacity to remove oxygen from the catalytic converter, are thereby recorded for the diagnosis. A characteristic offset of the first lambda probe is calculated from the ratio of the oxygen storage capacity and the oxygen removal capacity.

European Patent Application EP 2 884 066 A1 describes a method for diagnosing an object, such as a catalytic converter or a filter. To obtain especially accurate information about a function of the catalytic converter, it is thereby provided that a test medium having a defined composition, such as propane gas or carbon monoxide, be applied to a front side of the catalytic converter by a device through an opening, to measure a catalytic reactivity, and that a concentration of at least a reduced or oxidized constituent of the test medium be measured at a downstream position after passing through the catalytic converter. However, such an application of an (exhaust) gas of a defined composition is only possible in laboratory operation. Therefore, such a method is not suited for optimizing emissions in real vehicle operation.

German Patent Application 10 2005 054 733 A1 describes a combustion engine having an exhaust gas aftertreatment system in which an exhaust gas burner is located, which is able to accelerate the heating of a three-way catalytic converter in the exhaust gas aftertreatment system. It provides that the exhaust gas burner be operated in a cold-start phase of the combustion engine and remain activated at least until the three-way catalytic converter has reached the light-off temperature thereof.

German Patent Application DE 10 2012 011 113 A1 describes an exhaust system for a combustion engine having at least two exhaust gas aftertreatment components that are fluidically connected in series; the rear one of the two exhaust gas aftertreatment components being heatable by an electrical heating element.

SUMMARY OF THE INVENTION

It is, therefore, an object of the present invention to further enhance the conversion efficiency of the exhaust gas aftertreatment system and, in particular, to adapt the lambda control in a way that makes it possible to increase the efficiency of the exhaust gas aftertreatment components.

This objective is achieved in accordance with the present invention by a method for the exhaust gas aftertreatment of a combustion engine, whose exhaust is connected to an exhaust system. Disposed thereby in the exhaust system in the direction of exhaust gas flow through the exhaust system are a first catalytic converter, a second catalytic converter downstream of the first catalytic converter, and a third catalytic converter downstream of the second catalytic converter. In an exhaust duct of the exhaust system, a first lambda probe is disposed upstream of the first catalytic converter, and a second lambda probe is disposed downstream of the first catalytic converter and upstream of the second catalytic converter; a third lambda probe being disposed downstream of the second catalytic converter and upstream of the third catalytic converter. One of the catalytic converters disposed downstream of the first catalytic converter is thereby actively heatable. The method includes the following steps:

actively heating a catalytic converter downstream of the first catalytic converter;

comparing the component temperature of the particular catalytic converter to the respective light-off temperature of the catalytic converter;

controlling the fuel/air ratio via the lambda control of the combustion engine via that lambda probe disposed downstream of the last catalytic converter to reach the light-off temperature thereof.

To reach an effectiveness thereof, each catalytic emissions control device must exceed a minimum temperature, what is generally referred to as the light-off temperature. The method according to the present invention makes it possible for an additional catalyst volume for converting the pollutant components to be provided shortly after a passive heating carried out in response to the driver-applied load condition. This is especially significant when working with higher-load driving profiles since the catalytically acting surface is optimally utilized in such a case. A most efficient possible use of the active catalyst volume is made possible by the lambda control of the respective last lambda probe directly downstream of a catalytic converter, which has reached the light-off temperature thereof. This makes possible an especially efficient conversion of the pollutants, whereby the tailpipe emissions may be minimized.

Advantageous improvements to and refinements of the method indicated in the independent claim are rendered possible by the features delineated in the dependent claims.

A preferred embodiment of the present invention provides that the first lambda probe perform a lambda control at the start of the combustion engine. The untreated emissions of the combustion engine may be minimized by a lambda control to a stoichiometric fuel/air ratio in the cold-start phase, particularly when still none of the catalytic converters has reached the light-off temperature thereof, and an aftertreatment of the exhaust gas by the catalytic converters is not yet possible.

Another enhancement of the method provides that the lambda control be extended to include the lambda probe downstream of the actively heatable catalytic converter, as soon as this catalytic converter has reached the light-off temperature thereof. By extending the lambda control to include the lambda probe downstream of the actively heatable catalytic converter, the available, catalytically active exhaust gas aftertreatment volume is increased. Since the conversion efficiency is limited when catalytic converters are still comparatively cold, the efficiency of the exhaust gas aftertreatment may be hereby significantly improved in the cold-start phase. The active heating also makes it possible to ensure that the actively heatable catalytic converter reaches the light-off temperature thereof as quickly as possible following a cold start of the combustion engine and is thus able to convert the pollutant components contained in the exhaust gas into unlimited exhaust gas components.

Another preferred embodiment of the present invention provides that the active heating be adjusted as soon as the catalytic converter has reached the light-off temperature thereof. This makes it possible to reduce the energy demand of the exhaust gas aftertreatment system and the load on a battery of the motor vehicle. The further heating of the catalytic converter then takes place due to the exothermic reaction of the exhaust gas components on the surface of the catalytic converter.

A preferred specific embodiment of the method provides that the lambda control by the first lambda probe and the second lambda probe take place upstream and downstream of the first catalytic converter in response to the temperature of the actively heatable catalytic converter dropping below the light-off temperature thereof during operation of the combustion engine. This permits adaptation of the lambda control to the respective, catalytically active volume of the catalytic converters, so that the lambda control is performed on those catalytic converters, thereby making possible efficient conversion of the limited gaseous pollutant components.

Particularly advantageous in this context is when the active heating is reactivated in response to the temperature of the actively heatable catalytic converter dropping below the light-off temperature thereof during operation of the combustion engine. The active heating may reheat actively heatable catalytic converter to the light-off temperature thereof, increasing the available, catalytically active catalyst volume. This makes it possible to improve the conversion efficiency of the exhaust gas aftertreatment system and reduce tailpipe emissions.

The method is advantageously enhanced by ascertaining a load profile of the combustion engine that is to be expected, and by heating the actively heatable catalytic converter in response to it being assumed on the basis of the load profile to be expected that the component temperature of the actively heatable catalytic converter will drop below the light-off temperature thereof. It is thus possible, for example, to ascertain the driving behavior of the vehicle operator and/or to recognize his/her preferred routes. This may be accomplished, for example, on the basis of navigation data of the motor vehicle or on the basis of an evaluation of the engine data. If it is recognized that travel through the next drive segment to be expected is anticipated to be under a low-load operation of the combustion engine, where the temperature of the electrically heatable catalytic converter drops below the light-off temperature thereof, the heatable catalytic converter is then heated to make available a largest possible active catalyst volume.

The present invention provides an exhaust gas aftertreatment system for a combustion engine that is configurable to communicate with an exhaust of the combustion engine. The exhaust gas aftertreatment system includes an exhaust system in which a first catalytic converter, a second catalytic converter downstream of the first catalytic converter, and a third catalytic converter downstream of the second catalytic converter are disposed in the direction of exhaust gas flow through the exhaust system. In an exhaust duct of the exhaust system, a first lambda probe is disposed upstream of the first catalytic converter, and a second lambda probe is disposed downstream of the first catalytic converter and upstream of the second catalytic converter. In addition, a third lambda probe is disposed downstream of the second catalytic converter and upstream of the third catalytic converter. It is provided that one of the catalytic converters disposed downstream of the first catalytic converter be designed as an actively heatable catalytic converter, in particular as an electrically heatable catalytic converter. The exhaust gas aftertreatment system additionally includes a control unit that is adapted for implementing a method according to the present invention when the control unit executes a machine-readable program code. Such an exhaust gas aftertreatment system makes it possible to enhance the conversion efficiency of the catalytic converters and reduce emissions.

A preferred specific embodiment of the exhaust gas aftertreatment system provides that the catalytic converters be designed as three-way catalytic converters or have a three-way catalytically active exhaust gas aftertreatment component, in particular a catalytic coating. A three-way catalytic converter makes it possible to further oxidize both unburned hydrocarbon (HC) and carbon monoxide (CO), as well as reduce nitrogen oxides (NOx). Thus, in comparison to other catalytic converters, which are only able to reduce one exhaust gas component, the advantage is hereby derived that all limited exhaust gas components are able to be decreased by such a catalytic converter.

An advantageous further embodiment of the present invention provides that a fourth catalytic converter be disposed downstream of the first catalytic converter and upstream of the second catalytic converter. An additional catalytic converter is able to increase the available, catalytically active catalyst volume. This is not only advantageous in the cold-start phase in which the catalytic activity of the catalytic converters is still restricted, but also in a full-load operation of the combustion engine. Catalytic converters are also subject to an ageing process, whereby the conversion efficiency decreases over the service life of the catalytic converter. An additional catalytic converter creates a reserve here, thereby ensuring a sufficient catalyst volume even when there is significant ageing of the catalytic converters, thereby making possible a complete conversion of the limited exhaust gas components in all operating situations of the combustion engine.

It is especially thereby preferred when the fourth catalytic converter is essentially free of a component having oxygen storage capacity. Designing the fourth catalytic converter to include a washcoat, which is essentially free of a component having oxygen storage capacity, makes it possible for a lambda probe to jointly control the fourth catalytic converter and the second catalytic converter. Moreover, the control is not slowed down by filling and emptying an additional oxygen accumulator, making it possible to further enhance the efficiency of the exhaust gas aftertreatment.

A preferred specific embodiment of the exhaust gas aftertreatment system provides that the actively heatable catalytic converter include an electrical heating element. An electrical heating element, in particular an electrical heating disk, may be readily and cost-effectively integrated in the actively heatable catalytic converter. Alternatively, such a heating element may be connected directly upstream of the actively heatable catalytic converter. An electrical heating element has the advantage over heating using an exhaust gas burner of requiring relatively little installation space and, thus, of being able to be readily integrated in the exhaust system at little extra cost.

Another preferred variant of the exhaust gas aftertreatment system provides that the actively heatable catalytic converter be designed as a four-way catalytic converter. In addition to the limited gaseous exhaust gas components, a four-way catalytic converter is also able to retain particulates from the exhaust gas. This makes it possible to even fulfill future exhaust-emission standards where, besides the gaseous exhaust gas components, the quantity of emitted soot particulates is also limited.

It is especially preferred that the four-way catalytic converter have an electrically conductive filter substrate for the heating thereof in response to an electric voltage being applied thereto. The catalytically active structure may be directly heated by an electrically heatable filter substrate. This eliminates the need for an upstream connected heating element. Moreover, an electrical heating of the filter substrate may assist in regenerating the four-way catalytic converter in order to oxidize the soot particulates retained therein.

In an advantageous enhancement of the exhaust gas aftertreatment system, the first lambda probe is in the form of a wide band lambda probe and each of the further lambda probes in the form of step change sensors. A wide band lambda probe makes it possible to quantitatively determine the fuel/air ratio in the exhaust duct. The step change sensors make it possible to recognize a breakthrough through the particular catalytic converter, in order to adapt the fuel/air ratio accordingly in the course of the lambda control.

A preferred specific embodiment of the present invention provides that a temperature sensor be located in the exhaust system. A temperature sensor in the exhaust system makes it possible to determine the exhaust gas temperature and/or the component temperature of a catalytic converter. This makes it easier to discern whether the particular catalytic converter has reached the light-off temperature thereof. In particular, the temperature sensor may also be utilized to provide information in a calculation model for determining the component temperatures and to enhance the calculation model.

Unless indicated otherwise in the individual case, the various specific embodiments of the present invention mentioned in this Application may be advantageously combined with one another.

BRIEF DESCRIPTION OF THE DRAWINGS

The present invention will be explained in the following in light of exemplary embodiments and with reference to the accompanying drawings, in which.

DETAILED DESCRIPTION OF THE INVENTION

Figure 1:
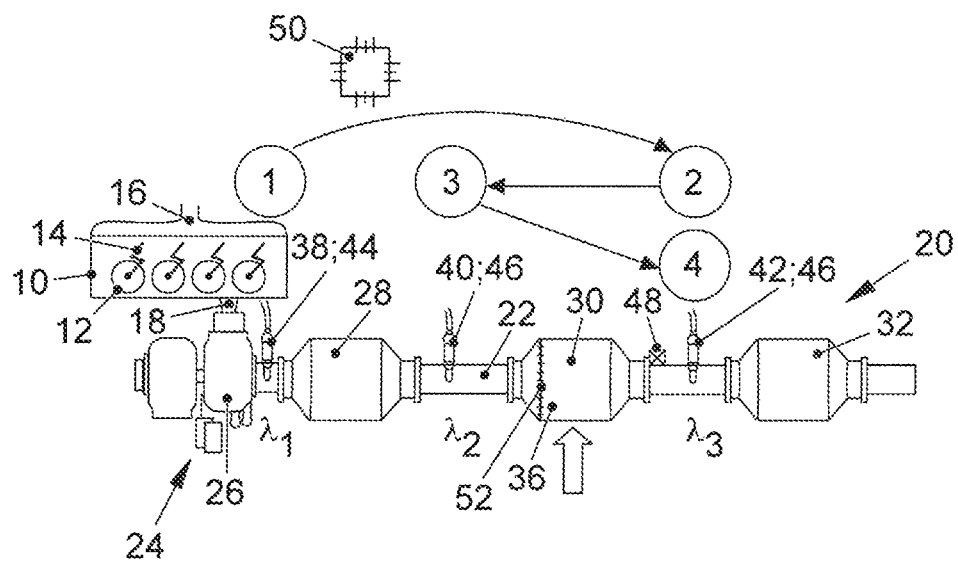
FIG. 1 shows an exemplary embodiment of a combustion engine having an exhaust gas aftertreatment system according to the present invention.

FIG. 1 schematically shows a combustion engine 10 having an exhaust gas aftertreatment system. Combustion engine 10 has a plurality of combustion chambers 12, each having a spark plug 14 disposed thereon. Combustion engine 10 has an intake 16 for communicating with an air supply system (not shown for the sake of clarity). In addition, combustion engine 10 has an exhaust outlet 18 for communicating with an exhaust system 20 in a way that allows an exhaust gas to be directed from combustion chambers 12 of combustion engine 10 into exhaust system 20. Exhaust system 20 includes an exhaust duct 22 in which a turbine 26 of an exhaust turbocharger 24, downstream of turbine 26, a first catalytic converter 28, downstream of first catalytic converter 28, a second catalytic converter 30, and further downstream, a third catalytic converter 32 are disposed in the flow direction of an exhaust gas of combustion engine 10 through exhaust duct 22. First catalytic converter 28 is preferably designed as a three-way catalytic converter and disposed in a close-coupled position in exhaust system 20. In this connection, a close-coupled position is understood to be a position having an exhaust gas flow length of less than 80 cm, preferably of less than 50 cm from exhaust outlet 18 of combustion engine 10. Second catalytic converter 30 is designed as an actively heatable catalytic converter 36, in particular as a three-way catalytic converter that is actively heatable by an electrical heating element 52. Third catalytic converter 32 is preferably disposed in an underbody position of a motor vehicle and likewise designed as a three-way catalytic converter. One of catalytic converters 28, 30, 32 is preferably designed as a four-way catalytic converter 54, so that it is also able to retain soot particulates in addition to converting the gaseous exhaust gas components.

A first lambda probe 38 is disposed in exhaust duct 22 downstream of turbine 26 of exhaust turbocharger 24 and upstream of first catalytic converter 28. First lambda probe 38 is preferably realized as a wide band lambda probe 44 and thus makes it possible to quantitatively assess the fuel/air ratio upstream of first catalytic converter 28. A second lambda probe 40, which is preferably realized as a step change sensor 46, is provided in exhaust duct 22 downstream of first catalytic converter 28 and upstream of second catalytic converter 30. A third lambda probe 42, which is preferably realized as a step change sensor 46, is disposed in exhaust duct 22 downstream of second catalytic converter 30 and upstream of third catalytic converter 32. A temperature sensor 48 may also be placed in exhaust duct 22 to measure the exhaust gas temperature and, thus, calculate the component temperature of catalytic converters 28, 30, 32.

Alternatively to an electrical heating element 52 that is connected upstream of catalytic converter 30, 32, one variant of actively heatable catalytic converter 36 as a four-way catalytic converter 54 provides that filter substrate 56 of particulate filter 54 also have an electrically conductive and, thus, directly heatable design.

Combustion engine 10, as well as lambda probes 38, 40, 42 and temperature sensor 48 communicate via signal lines with an engine control unit 50. The injection rate, the point of injection, and the ignition point in combustion chambers 12 are controlled on the basis of the information from lambda probes 38, 40, 42 and temperature sensor 48 to ensure a largely low-emission combustion of the fuel-air mixture.

It is essential that a largest possible active catalyst volume be quickly provided to minimize the emissions of combustion engine 10 following a cold start. Moreover, to enhance the conversion efficiency, it is necessary to adapt the continuous lambda control by using a trim control, whose controlled system is not only limited to first catalytic converter 28, as in the case of lambda controls known from the related art; rather a feedback control of the entire active catalyst volume is made possible.

To integrate an additional lambda probe 40, 42 in the controlled system of the trim control, catalytic converter 30, 32, disposed upstream of this lambda probe 40, 42, must have reached the light-off temperature thereof. Since this is not ensured in all operating situations, in the case of a remote-coupled position of catalytic converter 30, 32, in particular in an underbody position of a motor vehicle, an electrical heating element 52 externally heats second catalytic converter 40 following the start of combustion engine 10 or in low-load operating situations of combustion engine 10. The heating measures may be reduced or stopped to lower the total energy demand and to conserve a battery of the motor vehicle when the close-coupled first catalytic converter 28 has reached light-off temperature $T_{LOK1}$ thereof and second lambda probe 40, downstream of first catalytic converter 28, may be additionally used for the lambda control. As soon as actively heatable catalytic converter 36 has reached light-off temperature $T_{LOK2}$ thereof due to operation of combustion engine 10, the lambda control should again be extended to include third lambda probe 42. Realizing the variability in the controlled system of the lambda control requires intelligent detection of the already active catalyst volume. This may be accomplished, for example, by a calculation model stored in engine control unit 50 of combustion engine 10.

Figure 2:
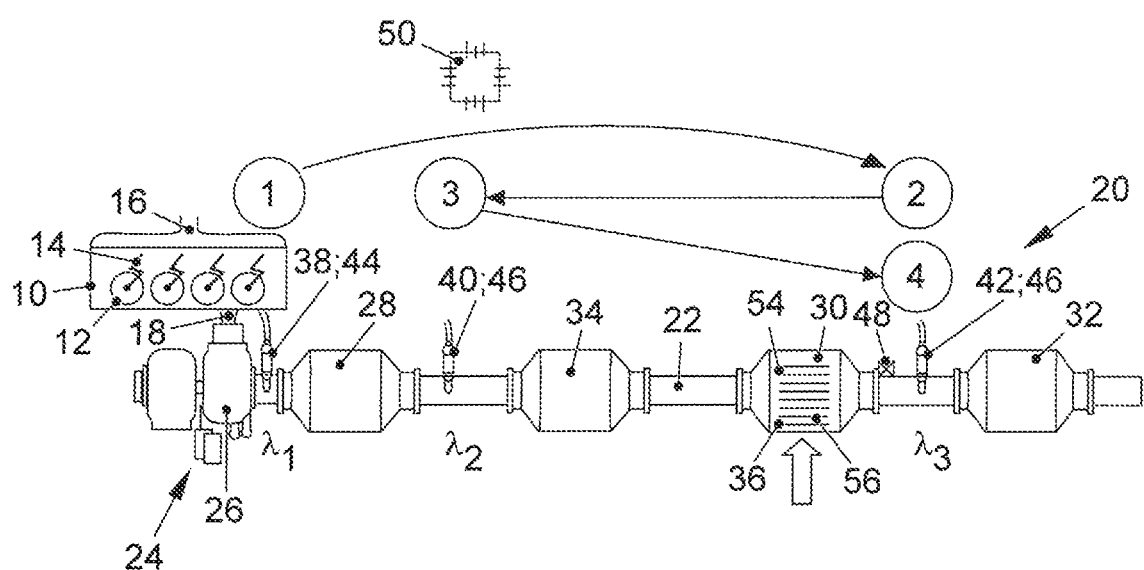
FIG. 2 shows another exemplary embodiment of an internal combustion engine for a combustion engine having an exhaust gas aftertreatment system according to the present invention.

FIG. 2 illustrates an alternative exemplary embodiment of an exhaust gas aftertreatment system according to the present invention. In essentially the same configuration as in FIG. 1, this exemplary embodiment provides a fourth catalytic converter 34 downstream of first catalytic converter 28 and upstream of second catalytic converter 30. Fourth catalytic converter 34 is preferably designed as a three-way catalytic converter having a washcoat, which is formed to be essentially free of a component having oxygen storage capacity. This makes it possible to increase the catalyst volume without requiring an additional lambda probe downstream of this fourth catalytic converter. The washcoat without oxygen storage capacity makes possible a joint control of fourth catalytic converter 34 and of heatable second catalytic converter 30, 36 via third lambda probe 42. A further lambda probe may also be alternatively provided; the controlled system of the lambda control being extended to include respective last lambda probe 38, 40, 42 in the flow direction, whose directly upstream catalytic converter 28, 30, 32 has reached the light-off temperature thereof. If none of catalytic converters 28, 30, 32 has reached the light-off temperature thereof, the lambda control is carried out via first lambda probe 38. Besides an enhanced conversion efficiency due to an increased catalyst volume as provided by additional fourth catalytic converter 34, the exhaust gas aftertreatment system provided in FIG. 2 also has the advantage of an enhanced ageing resistance.

Figure 3:
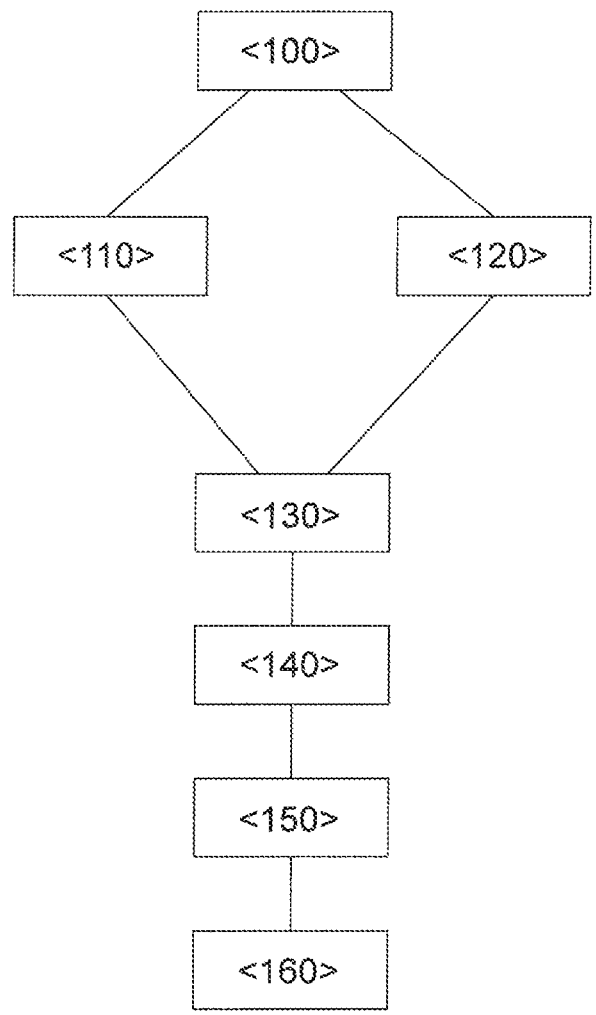
FIG. 3 shows a flow chart for implementing a method according to the present invention for the exhaust gas aftertreatment of a combustion engine.

FIG. 3 shows a flow chart for implementing a method according to the present invention for the exhaust gas aftertreatment of a combustion engine 10 having the exhaust gas aftertreatment system shown in FIG. 1. In the case of a cold start <100> of combustion engine 10, the lambda control initially takes place in a first method step <110> via first lambda probe 38, also referred to as guide probe. The fuel/air ratio of combustion engine 10 is thereby adjusted to a stoichiometric fuel/air ratio (λ=1). At the same time, in a method step <120>, electrically heatable catalytic converter 36 is heated; the aim being a most rapid possible utilization thereof. If electrically heatable catalytic converter 36 has reached the light-off temperature thereof, which a temperature measurement or a calculation model stored in control unit 50 may ascertain, third lambda probe 42 is used for the trim control downstream of electrically heatable catalytic converter 36. If electrically heatable catalytic converter 36 has reached the light-off temperature thereof, the heating of this catalytic converter 36 is deactivated in a next method step <130>. This may lead to a cooling of electrically heatable catalytic converter 36 to below the light-off temperature thereof, particularly in a low-load phase of combustion engine 10. In this case, in a next method step <140>, the lambda control is switched over to second lambda probe 40 downstream of close-coupled, first catalytic converter 28. If in further operation <150> of combustion engine 10, the exhaust gas of combustion engine 10 again heats electrically heatable catalytic converter 36 to the light-off temperature thereof, the lambda control is then set again to third lambda probe 42 in a method step <160>. Third catalytic converter 32 in exhaust system 20 is used for preventing emission breakthroughs during the on-board diagnosis of the third lambda probe. This third catalytic converter 32 is not actively integrated in the lambda control.

If combustion engine 10 is operated in a low-load operation, electrically heatable catalytic converter 36 may again be heated to the light-off temperature thereof by a renewed activation of electrical heating element 52. Thus, the catalytic activity of this catalytic converter 36 may even be ensured in low-load phases. If electrically heatable catalytic converter 36 again reaches the light-off temperature thereof, the lambda control may again be extended to include third lambda probe 42. This method makes it possible for the active catalyst volume to be maximized within the controlled system of the lambda control.

REFERENCE NUMERAL LIST

10 combustion engine
12 combustion chamber
14 spark plug
16 intake
18 exhaust outlet
20 exhaust system
22 exhaust duct
24 exhaust gas turbocharger
26 turbine
28 first catalytic converter
30 second catalytic converter
32 third catalytic converter
34 fourth catalytic converter
36 actively heatable catalytic converter
38 first lambda probe
40 second lambda probe
42 third lambda probe
44 wide band lambda probe
46 step change probe
48 temperature sensor
50 engine control unit
52 electrical heating element
54 four-way catalytic converter
56 filter substrate

The invention claimed is:

1. A method for exhaust gas aftertreatment of a combustion engine, whose exhaust is connected to an exhaust system,
   wherein the exhaust system comprises, in a direction of an exhaust gas flow therethrough, a first catalytic converter, a second catalytic converter downstream of the first catalytic converter, and a third catalytic converter downstream of the second catalytic converter;
   wherein in an exhaust duct of the exhaust system are disposed a first lambda probe upstream of the first catalytic converter, a second lambda probe downstream of the first catalytic converter and upstream of the second catalytic converter, and a third lambda probe downstream of the second catalytic converter and upstream of the third catalytic converter; and
   wherein one of the catalytic converters disposed downstream of the first catalytic converter is actively heatable;
   the method comprising the following steps:
   actively heating one of the catalytic converters downstream of the first catalytic converter;
   comparing a component temperature of the heated catalytic converter to a particular light-off temperature of the actively heated catalytic converter;
   controlling a fuel/air ratio via a lambda control of the combustion engine via the lambda probe immediately upstream of the actively heated catalytic converter if the actively heated catalytic converter has not reached its particular light-off temperature; and
   controlling the fuel/air ratio via the lambda control via the lambda probe immediately downstream of the actively heated catalytic converter if the actively heated catalytic converter has reached its particular light-off temperature.

2. The method for the exhaust gas aftertreatment as recited in claim 1, wherein the first lambda probe performs the lambda control at a start of the combustion engine.

3. The method for the exhaust gas aftertreatment as recited in claim 2, further comprising:
   after the start of the combustion engine but before the first catalytic converter has reached a particular light-off temperature for the first catalytic converter, controlling the fuel/air ratio via the lambda control via the first lambda probe; and
   after the first catalytic converter has reached its particular light-off temperature but before the second catalytic converter has reached its particular light light-off temperature, controlling the fuel/air ratio via the lambda control via the second lambda probe.

4. The method for the exhaust gas aftertreatment as recited in claim 1, wherein the active heating is adjusted as soon as the actively heated catalytic converter has reached its light-off temperature.

5. The method for the exhaust gas aftertreatment as recited in claim 1, wherein the lambda control is performed by the first lambda probe and the second lambda probe upstream and downstream of the first catalytic converter, respectively, in response to the temperature of the actively heated catalytic converter dropping below the light-off temperature thereof during operation of the combustion engine.

6. The method for the exhaust gas aftertreatment as recited in claim 5, wherein the active heating is reactivated in response to the temperature of the actively heated catalytic converter dropping below the light-off temperature thereof during operation of the combustion engine.

7. The method for the exhaust gas aftertreatment as recited in claim 1, wherein a load profile of the combustion engine that is to be expected, is ascertained, and the actively heated catalytic converter is heated in response to it being assumed on a basis of the load profile that the component temperature of the actively heated catalytic converter will drop below the light-off temperature thereof.

8. An exhaust gas aftertreatment system for a combustion engine that is configurable to communicate with an exhaust of the combustion engine, the exhaust gas aftertreatment system comprising:
   an exhaust system in which a first catalytic converter, a second catalytic converter downstream of the first catalytic converter, and a third catalytic converter downstream of the second catalytic converter are disposed in a direction of exhaust gas flow through the exhaust system;
   an exhaust duct of the exhaust system, having a first lambda probe being disposed upstream of the first catalytic converter, a second lambda probe being disposed downstream of the first catalytic converter and upstream of the second catalytic converter, and a third lambda probe being disposed downstream of the second catalytic converter and upstream of the third catalytic converter, and one of the catalytic converters disposed downstream of the first catalytic converter being designed as an actively heatable catalytic converter, and
   a control unit that is adapted for implementing a method according to claim 1 when the control unit executes a machine-readable program code.

9. The exhaust gas aftertreatment system as recited in claim 8, wherein the catalytic converters include a three-way catalytically active exhaust gas aftertreatment component.

10. The exhaust gas aftertreatment system as recited in claim 8, further comprising a fourth catalytic converter disposed downstream of the first catalytic converter and upstream of the second catalytic converter.

11. The exhaust gas aftertreatment system as recited in claim 10, wherein the fourth catalytic converter is designed to be essentially free of a component having oxygen storage capacity.

12. The exhaust gas aftertreatment system as recited in claim 8, wherein the actively heatable catalytic converter includes an electrical heating element.

13. The exhaust gas aftertreatment system as recited in claim 8, wherein the actively heatable catalytic converter is designed as a four-way catalytic converter, the four-way catalytic converter having an electrically conductive filter substrate for the heating thereof in response to an electric voltage being applied to the filter substrate.

14. The exhaust gas aftertreatment system as recited in claim 8, wherein the first lambda probe is realized as a wide band lambda probe, and each of the further lambda probes is realized as a step change sensor.

15. The exhaust gas aftertreatment system as recited in claim 8, further comprising a temperature sensor located in the exhaust system.

* * * * *